(12) United States Patent
Moune et al.

(10) Patent No.: US 9,315,258 B2
(45) Date of Patent: Apr. 19, 2016

(54) ELECTRIC FLIGHT CONTROL SYSTEM AND METHOD FOR AN AIRCRAFT

(71) Applicant: AIRBUS OPERATIONS SAS, Toulouse (FR)

(72) Inventors: Marie-Claire Moune, Tournefeuille (FR); Christophe Poujol, Saint-Jory (FR); Matthieu Barba, Toulouse (FR); Lilian Ronceray, La Salvetat St. Gilles (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 8 days.

(21) Appl. No.: 14/480,753

(22) Filed: Sep. 9, 2014

(65) Prior Publication Data
US 2015/0081140 A1 Mar. 19, 2015

(30) Foreign Application Priority Data
Sep. 13, 2013 (FR) ...................................... 13 58827

(51) Int. Cl.
| | |
|---|---|
| G01C 23/00 | (2006.01) |
| G05D 1/00 | (2006.01) |
| G05D 3/00 | (2006.01) |
| G06F 7/00 | (2006.01) |
| G06F 17/00 | (2006.01) |
| B64C 13/18 | (2006.01) |
| B64C 13/50 | (2006.01) |
| G05D 1/06 | (2006.01) |
| G05D 1/08 | (2006.01) |

(52) U.S. Cl.
CPC ............... *B64C 13/18* (2013.01); *B64C 13/503* (2013.01); *G05D 1/0061* (2013.01); *G05D 1/0615* (2013.01); *G05D 1/0808* (2013.01)

(58) Field of Classification Search
CPC ..... G05D 1/00; G05D 1/0808; G05D 1/0061; G05D 1/0615; B64C 13/18; B64C 13/503
USPC ......................................... 701/1, 3, 11, 12, 14
See application file for complete search history.

(56) References Cited

U.S. PATENT DOCUMENTS

| 4,642,774 A * | 2/1987 | Centala ................ G05D 1/0816 244/197 |
| 5,127,608 A * | 7/1992 | Farineau ............... B64C 13/503 244/178 |

(Continued)

FOREIGN PATENT DOCUMENTS

| EP | 1160157 | 12/2001 |
| FR | 2874204 | 2/2006 |
| FR | 2909462 | 6/2008 |

OTHER PUBLICATIONS

French Search Report for FR 13 58827 dated Jun. 5, 2014.

*Primary Examiner* — Jaime Figueroa
(74) *Attorney, Agent, or Firm* — Greer, Burns & Crain, Ltd.

(57) ABSTRACT

A flight control system includes at least one flight domain protection module intended at least for manual piloting and an auxiliary element configured to automatically transmit to the protection module, upon a detection of automatic piloting of the aircraft using an automatic piloting device, a predetermined auxiliary position, representing a control stick position equivalent, the protection module using the auxiliary position as a control stick position to implement a flight domain protection during the automatic piloting.

12 Claims, 1 Drawing Sheet

(56) References Cited

U.S. PATENT DOCUMENTS

| | | | |
|---|---|---|---|
| 5,197,697 A | 3/1993 | Lyloc et al. | |
| 5,722,620 A * | 3/1998 | Najmabadi | B64C 13/16 244/181 |
| 5,738,310 A * | 4/1998 | Rollet | G05D 1/0858 244/195 |
| 2002/0002428 A1 | 1/2002 | Kubica | |
| 2004/0153220 A1 | 8/2004 | Kubica | |
| 2005/0075761 A1 | 4/2005 | Kubica | |
| 2006/0058928 A1 * | 3/2006 | Beard | G05D 1/101 701/11 |
| 2007/0050101 A1 * | 3/2007 | Sacle | B64D 45/0015 701/11 |
| 2007/0246605 A1 | 10/2007 | Lavergne et al. | |
| 2010/0042270 A1 | 2/2010 | Villaume | |
| 2010/0217460 A1 * | 8/2010 | Polati De Souza | G05D 1/0676 701/18 |
| 2010/0305785 A1 * | 12/2010 | Faurie | G08G 5/025 701/9 |
| 2011/0251739 A1 * | 10/2011 | Tomas | B64C 13/503 701/3 |
| 2012/0290153 A1 * | 11/2012 | Olsoe | B64C 13/42 701/3 |
| 2013/0261853 A1 * | 10/2013 | Shue | B64C 19/00 701/3 |
| 2014/0100722 A1 * | 4/2014 | Louise | G01C 23/00 701/14 |
| 2014/0107873 A1 * | 4/2014 | Moune | G05D 1/0072 701/16 |
| 2014/0350755 A1 * | 11/2014 | Caillaud | G08G 5/02 701/18 |
| 2014/0371957 A1 * | 12/2014 | Riedinger | B64D 43/02 701/3 |

* cited by examiner

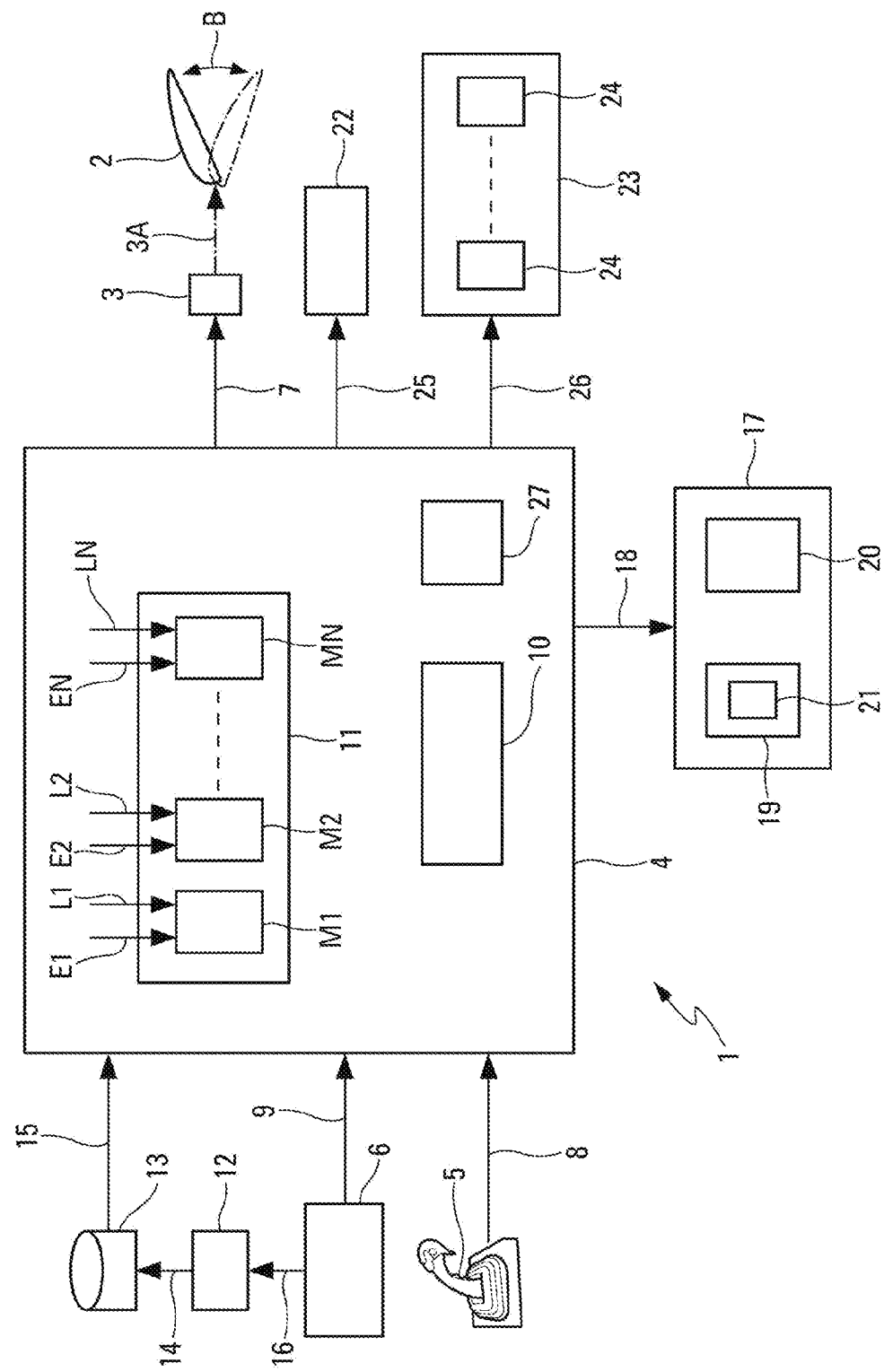

ELECTRIC FLIGHT CONTROL SYSTEM AND METHOD FOR AN AIRCRAFT

CROSS-REFERENCE

The present application claims priority to a French Patent Application No. FR 13 58827 filed Sep. 13, 2013 under 35 U.S.C. §119(a) and 365(b), which is incorporated herein by reference in its entirety.

BACKGROUND OF THE INVENTION

The present invention relates to an electric flight control system for an aircraft, in particular for a transport aircraft, and a method for controlling the flight of an aircraft with the aid of such a system.

In a standard manner, an aircraft flight control system comprises:
- at least one mobile control surface, able to be deflected as a function of deflection commands received;
- at least one control stick able to be actuated by a pilot of the aircraft, the position of the control stick generating first guidance commands representative of the position;
- an automatic piloting device able to generate second guidance commands; and
- at least one flight control computer which calculates control surface deflection commands, with the aid of an integrated computation means which contains piloting laws and which uses for this calculation guidance commands, the guidance commands corresponding to the first guidance commands during manual piloting and to the second guidance commands during automatic piloting.

Moreover, the automatic piloting device generally employs, in certain modes of operation, a protection of the flight domain of the aircraft (high and low speeds, high angle of attack, excessive attitudes) protecting the flight against excessive values of speeds and attitudes. Moreover, this automatic piloting device is generally limited in authority (for example +/−0.3 g longitudinally and +/−30° laterally).

With such limits, the performance and comfort objectives allotted to the automatic piloting device are attainable. Moreover, because of these limits, the effect of a fault of the automatic piloting device remains restricted, thereby making it possible to simplify the architecture and to lower the criticality of the faults of the automatic piloting device and therefore to simplify the design and validation thereof. Most automatic piloting devices exhibit authority limited to the exact need, and the entire design and fault analysis rest upon this assumption.

Moreover, the electric flight control system allows the crew at any moment to obtain the maximum maneuverability available, while remaining in a protected flight domain (in terms of speed, angle of attack and attitude). If the crew, in manual piloting mode, deflects the control stick fully, the system makes it possible to glean the maximum from the aircraft's usual capabilities.

To cope with exceptional events such as wind gusts or large wind gradients (change of wind direction), a dedicated unit disengages the automatic piloting device when the latter does not succeed in maintaining the aircraft in the normal flight domain, on account of its limited authority. An alarm is then emitted and the crew must optionally carry out compensation by using the full authority available with the manual flight controls.

Although not presenting any safety problem, such a manner of operation induces an overload of work for the crew and a risk of deviation of the initial trajectory, whereas the exterior disturbance phenomena are often momentary, and the flight could, after the event, continue to be carried out with the automatic piloting device if it has remained engaged.

Moreover, the automatic piloting device cannot be engaged when the aircraft is outside of the normal domain of use of the device. In such a situation (when the aircraft is outside of the flight domain in which the automatic piloting device operates normally), the pilot must therefore pilot the aircraft manually to restore it to the normal flight domain. It will be possible to reengage the automatic piloting device only when the aircraft is back in the normal flight domain.

This standard electric flight control system therefore generates an overload of work for the pilot under particular flight conditions, for which the automatic piloting device does not succeed in maintaining the aircraft in the normal flight domain, on account of its limited authority.

SUMMARY OF THE INVENTION

The object of the present invention is to remedy this drawback. It relates to an electric flight control system for an aircraft, of the type comprising:
- at least one mobile control surface, able to be deflected as a function of deflection commands received;
- at least one control stick, able to be actuated manually by a pilot of the aircraft, the position of the control stick generating first guidance commands representative of the position;
- an automatic piloting device, able to automatically generate second guidance commands; and
- at least one flight control computer configured to automatically compute control surface deflection commands, with the aid of an integrated computation unit which contains piloting laws, this integrated computation unit using guidance commands to compute these control surface deflection commands, the guidance commands corresponding to the first guidance commands during manual piloting of the aircraft and to the second guidance commands during automatic piloting of the aircraft, the flight control computer comprising at least one protection module for protecting the flight domain of the aircraft defining a protection as a function of a control stick position received during manual piloting, the protection module being able to limit the deflection command transmitted to the control surface.

According to the invention, the flight control system is noteworthy in that it comprises moreover:
- a first detection element configured to automatically detect automatic piloting of the aircraft with the aid of the automatic piloting device; and
- an auxiliary element configured to automatically transmit to the flight domain protection module, upon the detection of automatic piloting, a predetermined auxiliary position, representing a control stick position equivalent, the flight domain protection module using this auxiliary position as control stick position to implement the protection during this automatic piloting.

Thus, by virtue of the invention, during automatic piloting of the aircraft (via the automatic piloting device), use is made of one or more standard protections (devised to protect the aircraft's flight domain during manual piloting), by introducing into the corresponding protection module or modules a predetermined auxiliary position, representing a control stick position equivalent, thereby making it possible to use this or these protections during this automatic piloting. Consequently, when the automatic piloting device is engaged, these protections protect the aircraft, so that the automatic piloting device need no longer be disengaged when the aircraft approaches the limits of the flight domain. It therefore becomes possible to maintain the automatic piloting device engaged in a flight domain equivalent to that for manual piloting. Thus, whatever the exterior disturbances to which the aircraft will be subjected, the automatic piloting device can remain engaged. Moreover, at any moment, even in case of severe disturbances or of unintentional exiting of the normal flight domain, the automatic piloting device can be reengaged, the effect of which will be to return the aircraft to the normal flight domain. These characteristics make it possible to reduce the pilot's work overload existing with a standard flight control system and thus to remedy the aforementioned drawback.

The flight control system can comprise one or more of the following elements or characteristics, taken individually or in combination:
  the flight control computer comprises a plurality of different flight domain protection modules, and the auxiliary element is configured to transmit, during automatic piloting, an auxiliary position to at least some of the protection modules;
  the flight control system comprises a second detection element configured to detect automatically, during automatic piloting, a usual mode of the automatic piloting device, and the auxiliary element is configured to transmit a predetermined auxiliary position associated with this usual mode;
  the flight control computer comprises at least one flight domain protection module carrying out at least one of the following protections:
  a high speed protection;
  a low speed protection;
  a maximum trim protection;
  a minimum trim protection;
  an angle of attack protection; and
  a roll protection;
  the flight control computer comprises an alert unit (of visual and/or audible type) configured to forewarn a pilot, if appropriate, of the implementation of a protection by the protection module during automatic piloting;
  the flight control computer comprises a detection device configured for detecting a situation of risk of implementation of a protection by the protection module, and it is configured to act on at least one of the following assemblies: an automatic thrust device and airbrakes of the aircraft, in such a way as to at least delay the implementation of the protection by the protection module.

The present invention also relates to a method for controlling the flight of an aircraft, with the aid of an electric flight control system such as that aforementioned.

According to the invention, the method comprising:
  monitoring the type of piloting (manual piloting, automatic piloting) implemented by the flight control system so as to be able automatically to detect automatic piloting of the aircraft with the aid of the automatic piloting device; and
  automatically transmitting to the flight domain protection module, upon the detection of automatic piloting, a predetermined auxiliary position, representing a control stick position equivalent, the flight domain protection module using this auxiliary position as control stick position to implement the protection during this automatic piloting.

Advantageously, the auxiliary position can correspond at least to one of the following positions of the control stick:
  a position at neutral of the control stick;
  a position relating to a complete deflection of the control stick;
  at least one position relating to a deflection of the control stick, lying between the position at neutral and the complete deflection of the control stick.

Moreover, the method can comprise one or more of the following steps, taken individually or in combination:
  a step including increasing the domain of activation of at least one of the following elements of the flight control system:
  an automatic thrust device;
  airbrakes;
  a low energy alarm;
  a unit for deleting non-essential information of a display of primary flight parameters in predetermined situations;
  a step including limiting a roll command as a function of speed during automatic piloting;
  a step including, after the implementation of a protection by a flight domain protection module, automatically returning the automatic piloting device to the initial guidance mode which was active before the implementation of the protection, for any guidance mode other than an altitude maintaining mode.

Moreover, the present invention also relates to an aircraft, in particular a transport aircraft, which comprises an electric flight control system such as that aforementioned.

The foregoing and other aspects and features of the disclosure will become apparent to those of reasonable skill in the art from the following detailed description, as considered in conjunction with the accompanying drawings.

BRIEF DESCRIPTION OF THE DRAWINGS

The FIG. 1 of the appended drawing will elucidate the manner in which the invention may be embodied. This single FIGURE is the schematic diagram of a system which illustrates an embodiment of the invention.

DETAILED DESCRIPTION OF THE PREFERRED EMBODIMENTS

The system 1 represented schematically in FIG. 1 and making it possible to illustrate the invention is an electric flight control system for an aircraft, in particular for a transport aircraft.

The electric flight control system 1, which is onboard the aircraft, is of the type comprising:
  at least one standard mobile control surface 2 (for example an elevator) of the aircraft, this control surface 2 being able to be deflected (by an angle B) under the action of a standard actuator 3 (as illustrated by a chain-dotted arrow 3A), as a function of deflection commands received;
  at least one control stick 5 which is able to be actuated manually by a pilot of the aircraft. The position of the control stick 5 generates, in a standard manner, first guidance commands representative of position into which the control stick 5 is brought;
  an automatic piloting device 6 which is able to automatically generate second guidance commands; and
  at least one flight control computer 4 which is connected by way of links 7, 8 and 9 respectively to the actuator 3, to the control stick 5 and to the automatic piloting device 6 and which is configured to automatically compute in a standard manner, with the aid of an integrated computation unit 10, control surface deflection commands, which are transmitted to the actuator 3 via the link 7.

This unit 10 contains piloting laws and uses, for the computation, guidance commands which correspond:
- to the first guidance commands (received via the link 8) during manual piloting of the aircraft; and
- to the second guidance commands (received via the link 9) during automatic piloting of the aircraft.

The flight control computer 4 also comprises an assembly 11 of protection modules M1 to MN for protecting the flight domain of the aircraft, N being an integer. These protection modules M1 to MN carry out, in a standard manner, protection as a function of a control stick position 5 received during manual piloting via links E1 to EN (which are for example connected to the link 8). These protection modules M1 to MN are able to limit, in a standard manner, the deflection command transmitted to the actuator 3 of the control surface 2 by the computer 4.

According to the invention, the flight control system 1 comprises moreover:
- a detection element 12 which is configured to automatically detect automatic piloting of the aircraft (implemented with the aid of the automatic piloting device 6). More precisely, it is able to detect engagement of the automatic piloting device 6 to which it is for example connected by way of a link 16; and
- an auxiliary element 13 which is connected by way of links 14 and 15, respectively, to the detection element 12 and to the computer 4. This auxiliary element 13, for example a database, is configured to automatically transmit to at least some of the protection modules M1 to MN (via links L1 to LN connected for example to the link 15), upon the detection of automatic piloting by the detection element 12, predetermined auxiliary positions, representing a control stick position equivalent. The protection module or modules M1 to MN concerned each use the auxiliary position received, as control stick position, to implement the corresponding protection, during automatic piloting.

Thus, by virtue of these characteristics, the flight control system 1 is able to protect the flight domain of the aircraft (high and low speeds, high angle of attack, excessive attitudes) when the automatic piloting device 6 is engaged, while using the full authority of the aircraft. Thus, there is no longer any reason to disengage the automatic piloting device 6 during a significant external disturbance, such as wind gradients, since having full authority, the pilot will not be able to do better than the automatic piloting device 6. Moreover, this makes it possible to be able to engage the automatic piloting device 6 throughout the flight domain superintended by the flight controls and thus to have a very intuitive means of returning the aircraft to the normal flight domain.

The detection element 12 and/or the auxiliary element 13 can be integrated into the flight control computer 4.

The assembly 11 of the flight control computer 4 comprises a plurality of different protection modules M1 to MN, and the auxiliary element 13 is configured to transmit, during automatic piloting, an auxiliary position to at least some of the protection modules M1 to MN.

More precisely, the flight control computer 4 comprises protection modules M1 to MN carrying out at least some of the following protections:
- a high speed protection;
- a low speed protection;
- a maximum trim protection;
- a minimum trim protection;
- an angle of attack protection; and
- a roll protection.

Moreover, the auxiliary position transmitted by the auxiliary element 13 can correspond at least to one of the following equivalent positions of the control stick:
- a position at neutral;
- a position relating to a complete deflection of the control stick; and
- at least one position relating to a deflection lying between the position at neutral and the complete deflection of the control stick.

The flight control system 1 also comprises a detection element, preferably the detection element 12, which is configured to detect automatically, during automatic piloting, the usual guidance mode of the automatic piloting device 6. In this case, the auxiliary element 13 is configured to transmit a predetermined auxiliary position associated with the usual guidance mode thus detected.

In a preferred embodiment, the auxiliary position can vary as a function of the protection considered, that is to say that at a given instant different (or not) values of auxiliary position are provided via the links L1 to LN. The auxiliary position can correspond to the positions indicated hereinbelow for various modes of guidance, namely:

A/ for a high speed protection (Vmax):
- in all the modes of guidance of the automatic piloting device 6, except an altitude maintaining ALT mode, the stick equivalent is a "stick at neutral" equivalent; and
- in the ALT mode of the automatic piloting device 6 (maintaining of an altitude), the stick equivalent used for the speed high protection is a "stick at half-deflected" equivalent, thereby making it possible to favor the maintaining of the altitude, while retaining a minimum of authority for the pilot;

B/ for a minimum trim protection ($\theta$min):
the flight controls minimum trim protection not depending on the position of the stick 5, under automatic piloting this protection is applied without any modification;

C/ for an angle of attack protection (low speed) as normal law:
in all the modes of the automatic piloting device 6, the stick equivalent used for the angle of attack protection is a "full deflected stick" equivalent;

D/ for a low speed protection as alternate law:
- in the landing configurations (slats/flaps in configuration 3 and "Full"), the stick equivalent used for the low speed protection is a "quarter deflected stick" equivalent; and
- in the configurations other than those of landing, the stick equivalent used for the low speed protection is a "stick at neutral" equivalent;

E/ for a maximum trim protection ($\theta$max):
the same deflected stick equivalent is used as that of the angle of attack protection, namely:
- as normal law, a "full deflected stick" equivalent;
- as alternate law and in landing configuration, a "quarter deflected stick" equivalent; and
- as alternate law for the other configurations, a "neutral stick" equivalent; and F/ for a roll protection, the stick equivalent used for the roll protection is a "full deflected stick" equivalent.

As a function of the modes of guidance of the automatic piloting device 6, it may be desirable either to provide the full authority to the automatic piloting device 6 (in this case, a "full deflected stick" equivalent is used), or that the pilot retains additional authority with respect to the action of the automatic piloting device 6 (in this case, an equivalent other than a "full deflected stick" equivalent is used, for example a "stick at neutral", "quarter deflected stick" or "stick at half-deflected" equivalent). Indeed, using the full authority of the aircraft appreciably decreases the margins with respect to the structural limits and/or to stalling. Hence, in certain situations, it may be desirable that the automatic piloting device 6 does not reduce all the margins without intentional action by the crew. The present invention thus allows case-by-case adaptation, by using an appropriate stick equivalent.

The flight control system 1 also comprises an alert unit 17 which is connected by way of a link 18 to the flight control computer 4 and which is configured to forewarn a pilot, if appropriate, of the implementation of a protection by a protection module M1 to MN during automatic piloting. This alert unit 17 can comprise in particular:
- a display unit 19 which carries out a display on a viewing screen 21 making it possible to implement a visual alert; and
- a standard means 20 for generating an audible alert in the flight deck.

In a preferred embodiment, the elements 6, 9, and 12 to 16 form part of the flight control computer 4.

Moreover, the flight control computer 4 also comprises means 27 for detecting a situation of risk of implementation of a protection by at least one of the protection modules M1 to MN of the assembly 11. Moreover, the flight control computer 4 is configured to act on an automatic thrust device 22 and/or on an assembly 23 of airbrakes 24 of the aircraft (which are connected via links 25 and 26 to the computer 4) so as to delay the implementation of the protection by the protection module or modules M1 to MN.

Moreover, the flight control computer 4 can have an integrated device for increasing the domain of activation of at least one of the following elements of the flight control system 1:
- the automatic thrust device 22;
- the airbrakes 24;
- a low energy alarm, forming for example part of the alarm means 20; and
- a unit for deleting non-essential information of a display of primary flight parameters in predetermined situations, forming for example part of the display unit 19.

More particularly, the automatic thrust device 22 can implement a standard function for protection against situations of low energy (low speed, high angle of attack, low engine thrust), of "alpha floor" type, including automatically increasing the thrust of the engines of the aircraft so that they provide a maximum thrust. In order to cover the whole of the flight domain of the aircraft, the domain of activation of this automatic thrust device 22 implementing an "alpha floor" function is extended when the automatic piloting device 6 is engaged. In a preferred embodiment, the new domain for activation is:
- Mach <0.5; or
- the speed of the aircraft is less than VLS −20 knots and the automatic piloting device 6 is engaged.

Moreover:
- when the speed of the aircraft becomes excessive (Vmax+5 kt), the automatic thrust device 22 is automatically engaged, thereby making it possible to reduce the thrust in the case where the piloting of the thrust was manual;
- when the "alpha floor" function is triggered, the airbrakes 24 are (automatically) completely retracted; and
- when the speed of the aircraft exceeds the maximum speed of 5 knots or else when the speed of the aircraft (plus the drift at 10 seconds of the speed) exceeds the maximum speed of 10 knots, the airbrakes 24 are automatically deployed. These latter are retracted as soon as the speed of the aircraft decreases below the sum of the maximum speed and of 2 knots.

Moreover, because of the extension of the flight domain of the automatic piloting device 6, the latter is caused to operate at large roll angles. Hence, at large angle of roll, the lateral command is given priority over the elevational command. Under automatic piloting, the elevational command is therefore limited as a function of the roll of the aircraft, the maximum roll angle authorized by the automatic piloting device 6 is 30°.

In a reciprocal manner, when the speed of the aircraft becomes low, it is preferable to maintain the roll at low values. Hence, when the automatic piloting device 6 is engaged, the roll command is limited as a function of the speed.

Moreover, the automatic piloting device 6 is configured to be returned automatically, after the implementation of a protection by at least one protection module M1 to MN of the assembly 11, into the initial guidance mode which was active before the implementation of the protection, and this for any guidance mode other than an altitude maintaining mode.

Thus, the automatic piloting device 6 retains the initial mode of guidance when the protections of the flight controls cause the aircraft transiently to abandon its initial objective. Hence, when the disturbance disappears, the automatic piloting device 6 regains its initial guidance mode, with the exception of the ALT (altitude maintaining) mode.

In this altitude maintaining mode, if a sufficiently significant disturbance causes the aircraft to leave the initial altitude, a return to this altitude is not necessarily the best strategy. Hence, two cases are envisaged:
- either the aircraft has diverged little from the initial altitude (for example by less than 250 feet: below the alert altitude triggering threshold). In this case, the automatic piloting device 6 seeks to return the aircraft to the initial altitude;
- or the aircraft has diverged appreciably from the initial altitude (for example by more than 250 feet: above the alert altitude triggering threshold). In this case, the automatic piloting device 6 seeks to maintain a level by using the mode for maintaining zero vertical speed (V/S=0). Thus, the aircraft flies level at a different altitude from the initially instructed altitude, but the alert implemented allows the crew to understand the situation, while minimizing the divergence from the initial altitude.

The system 1 therefore comprises an alert unit 17, and in particular a display unit 19 comprising in particular a screen 21 of FMA ("Flight Mode Annunciator") type, which enables the crew to understand the situation.

In a preferred embodiment, when the protections of the flight controls generate an action which oversteps the command of the automatic piloting device 6:
- a message "AP IN PROT" (automatic piloting device 6 in protection) is displayed on the display unit 19 (screen 21 of FMA type for example);
- the longitudinal mode, the objective of which is no longer held to by the automatic piloting device 6, is signaled in an appropriate color, for example in amber; and
- an audio alert is generated via the unit 20.

In this preferred embodiment, means are reused which are already used for the automatic piloting device 6 to signal unusual modes and changes of mode that are not ordered by the crew, thereby making it possible to facilitate the understanding of the situation by the pilot. This principle is also applied in respect of the engagement of the device 22.

Moreover, so as to correctly retrieve for the crew a change of state of the position of the airbrakes 24:
- a message "SPD BRK AUTO EXT" (airbrakes 24 extended) is displayed on the viewing screen 21; and airbrakes 24 deflection markers are displayed in an appropriate color, for example in amber.

Moreover, an audio alarm, called low energy, which is generated at low altitude (for example via the unit 20) when the energy of the aircraft decreases, exhibits a triggering threshold which is set in such a way that it is emitted before the triggering of the "alpha floor" function. This allows the crew to implement appropriate actions (increase the thrust and/or retract the airbrakes 24). As the domain of activation of the "alpha floor" function is extended to the whole of the flight domain, the conditions of activation of this alarm are also extended under automatic piloting, so as to maintain the objective of triggering this alarm before the triggering of the "alpha floor" function.

In a preferred embodiment, this alarm is generated under automatic piloting only, whatever the altitude and the configuration of the aircraft, if the speed is less than the maximum of:

the speed corresponding to the "alpha floor" protection; VLS−10 feet.

As indicated hereinabove, the system 1 also comprises a unit for deleting non-essential information of a display of primary flight parameters (in particular a screen of FMA type) in predetermined situations, forming for example part of the display unit 19.

This unit is disabled as long as the automatic piloting device 6 is engaged.

Thus, by virtue of the invention, the system 1 therefore uses standard protections of the flight controls (under manual piloting) by introducing into the latter a deflection equivalent of the control stick 5 (which can depend on the modes of guidance of the automatic piloting device 6 and/or the configuration of the aircraft). When the automatic piloting device 6 is engaged, the result of the protections limits the command delivered and thus makes it possible to protect the aircraft with the authority of the flight controls. Thus protected, it is no longer necessary to disengage the automatic piloting device 6 when the aircraft approaches the limits of the flight domain, since the protections of the flight controls will do, if so desired, as well as would a pilot (by acting manually on the control stick 5). It therefore becomes possible to maintain the automatic piloting device 6 engaged in a flight domain equivalent to that of the flight controls. Moreover, it is also possible to authorize the engagement of the automatic piloting device 6 in a much widened flight domain, and thus to have an automatic piloting device 6 returning the aircraft to the normal flight domain.

Consequently, whatever the exterior disturbances to which the aircraft will be subjected, the automatic piloting device 6 can remain engaged, and at any moment, even in case of severe disturbances or of unintentional exiting of the normal flight domain, the automatic piloting device 6 can be reengaged, the effect of which will be to return the aircraft to the normal flight domain. This makes it possible to reduce the workload of the pilot who will therefore no longer have to return the aircraft to its nominal flight domain before being able to engage the automatic piloting device 6.

It will be noted that the present invention does not envisage simply developing in the automatic piloting device 6 a flight domain protection equivalent to that of the flight controls, which would in practice pose numerous difficulties, and in particular:

the parameters used to be able to effectively protect the flight domain of the aircraft being appreciably different from the parameters required for the automatic piloting device, a duplication of the piloting laws would also presuppose a duplication of the processing of the inputs necessary for its proper operation;

a very expensive additional activity of validation would be necessary, to validate these new protections when they are included in the automatic piloting device; and the automatic piloting device ought also to possess the level of integrity required to accommodate a protection function potentially having full authority over the control surfaces of the aircraft, which would complicate the realization thereof in particular because of the increase in integrity of numerous functions.

The use of the standard protections of the manual piloting, by taking into account a control stick equivalent, makes it possible to remedy these drawbacks, that is to say to obtain a protection for which no duplication of the processing of the inputs and no particular development are necessary and a reduced validation is sufficient.

While preferred embodiments of the disclosure have been herein illustrated and described, it is to be appreciated that certain changes, rearrangements and modifications may be made therein without departing from the scope of the disclosure and as set forth in the following claims.

What is claimed is:

1. An electric flight control system for an aircraft, comprising:

at least one mobile control surface configured to be deflected as a function of deflection commands received;

at least one control stick configured to be actuated manually by a pilot of the aircraft, a position of the control stick generating first guidance commands representative of the position;

an automatic piloting device configured to automatically generate second guidance commands; and at least one flight control computer configured to automatically compute control surface deflection commands, with an aid of an integrated computation unit which contains piloting laws, the integrated computation unit using guidance commands to compute the control surface deflection commands, the guidance commands corresponding to the first guidance commands during manual piloting of the aircraft and to the second guidance commands during automatic piloting of the aircraft, the flight control computer comprising at least one flight domain protection module for protecting a flight domain of the aircraft defining a protection as a function of a control stick position received during manual piloting, the protection module being able to limit the deflection command transmitted to the control surface, wherein the flight control system further includes:

a first detection element configured to automatically detect automatic piloting of the aircraft with the aid of the automatic piloting device; and an auxiliary element configured to automatically transmit to the flight domain protection module, upon the detection of automatic piloting, a predetermined auxiliary position, representing a control stick position equivalent, the flight domain protection module using the auxiliary position as a control stick position to implement the protection during the automatic piloting, wherein the auxiliary position varies as a function of the protection considered based on a guidance mode of the automatic piloting device.

2. The system according to claim 1, wherein the flight control computer includes a plurality of different flight domain protection modules, and the auxiliary element is configured to transmit, during automatic piloting, the auxiliary position to at least some of the protection modules.

3. The system according to claim 1,
further comprising a second detection element configured to detect automatically, during automatic piloting, a usual mode of the automatic piloting device, and the auxiliary element is configured to transmit the predetermined auxiliary position associated with the usual mode.

4. The system according to claim 1,
wherein the flight control computer includes the at least one flight domain protection module configured for carrying out at least one of the following protections:
a high speed protection;
a low speed protection;
a maximum trim protection;
a minimum trim protection;
an angle of attack protection; and
a roll protection.

5. The system according to claim 1,
further comprising an alert unit configured to forewarn a pilot of the implementation of a protection by the protection module during automatic piloting.

6. The system according to claim 1, further comprising an automatic thrust device and airbrakes, and a detection device configured for detecting a situation of risk of implementation of a protection by the protection module, and wherein the flight control system is configured to act on at least one of the following assemblies: the automatic thrust device and the airbrakes of the aircraft, in such a way as to at least delay the implementation of the protection by the protection module.

7. A method for controlling the flight of an aircraft, comprising:
providing at least one mobile control surface configured to be deflected as a function of deflection commands received;
providing at least one control stick configured to be actuated manually by a pilot of the aircraft, a position of the control stick generating first guidance commands representative of the position;
providing an automatic piloting device configured to automatically generate second guidance commands;
providing at least one flight control computer configured to automatically compute control surface deflection commands, with the aid of an integrated computation unit which contains piloting laws, the integrated computation unit using guidance commands to compute the control surface deflection commands, the guidance commands corresponding to the first guidance commands during manual piloting of the aircraft and to the second guidance commands during automatic piloting of the aircraft, the flight control computer comprising at least one flight domain protection module for protecting a flight domain of the aircraft defining a protection as a function of a control stick position received during manual piloting, the protection module being able to limit the deflection command transmitted to the control surface;
monitoring a type of piloting implemented by a flight control system to be able to automatically detect automatic piloting of the aircraft with the aid of the automatic piloting device;
automatically transmitting to the flight domain protection module, upon the detection of automatic piloting, a predetermined auxiliary position, representing a control stick position equivalent, the flight domain protection module using the auxiliary position as a control stick position to implement the protection during the automatic piloting; and
varying the auxiliary position as a function of the protection considered based on a guidance mode of the automatic piloting device.

8. The method according to claim 7,
wherein the auxiliary position corresponds at least to one of the following positions of the control stick:
a position at neutral of the control stick;
a position relating to a complete deflection of the control stick; and
at least one position relating to a deflection of the control stick, lying between the position at neutral and the complete deflection of the control stick.

9. The method according to claim 7,
further comprising modifying a domain of activation of at least one of the following elements of the flight control system:
an automatic thrust device;
airbrakes;
a low energy alarm; and
a unit for deleting non-essential information of a display of primary flight parameters in predetermined situations.

10. The method according to claim 7,
further comprising limiting a roll command as a function of speed during automatic piloting.

11. The method according to claim 7,
further comprising, after the implementation of the protection by the flight domain protection module, automatically returning the automatic piloting device to the initial guidance mode which was active before the implementation of the protection, for any guidance mode other than an altitude maintaining mode.

12. An aircraft having an electric flight control system for the aircraft, the system comprising:
at least one mobile control surface configured to be deflected as a function of deflection commands received;
at least one control stick configured to be actuated manually by a pilot of the aircraft, a position of the control stick generating first guidance commands representative of the position;
an automatic piloting device configured to automatically generate second guidance commands; and
at least one flight control computer configured to automatically compute control surface deflection commands, with an aid of an integrated computation unit which contains piloting laws, the integrated computation unit using guidance commands to compute the control surface deflection commands, the guidance commands corresponding to the first guidance commands during manual piloting of the aircraft and to the second guidance commands during automatic piloting of the aircraft, the flight control computer comprising at least one flight domain protection module for protecting a flight domain of the aircraft defining a protection as a function of a control stick position received during manual piloting, the protection module being able to limit the deflection command transmitted to the control surface,
wherein the flight control system further includes:
a first detection element configured to automatically detect automatic piloting of the aircraft with the aid of the automatic piloting device; and
an auxiliary element configured to automatically transmit to the flight domain protection module, upon the detection of automatic piloting, a predetermined auxiliary position, representing a control stick position equivalent, the flight domain protection module using the auxiliary position as a control stick position to implement the protection during the automatic piloting,
wherein the auxiliary position varies as a function of the protection considered based on a guidance mode of the automatic piloting device.

* * * * *